US011734506B2

(12) United States Patent
Kobayashi

(10) Patent No.: US 11,734,506 B2
(45) Date of Patent: Aug. 22, 2023

(54) INFORMATION PROCESSING APPARATUS AND NON-TRANSITORY COMPUTER READABLE MEDIUM STORING PROGRAM

(71) Applicant: FUJIFILM Business Innovation Corp., Tokyo (JP)

(72) Inventor: Saneyuki Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 350 days.

(21) Appl. No.: 16/945,920

(22) Filed: Aug. 2, 2020

(65) Prior Publication Data
US 2021/0224472 A1    Jul. 22, 2021

(30) Foreign Application Priority Data

Jan. 20, 2020    (JP) .................................. 2020-006512

(51) Int. Cl.
*G06F 17/00*    (2019.01)
*G06F 40/186*    (2020.01)
(Continued)

(52) U.S. Cl.
CPC .......... *G06F 40/186* (2020.01); *G06V 30/414* (2022.01); *G06V 30/416* (2022.01)

(58) Field of Classification Search
CPC ... G06F 40/186; G06V 30/414; G06V 30/416
See application file for complete search history.

(56) References Cited

U.S. PATENT DOCUMENTS 8,064,096 B2 * 11/2011 Waara .................. G06F 40/186
382/209
2006/0136809 A1 * 6/2006 Fernstrom ............. G06F 40/186
715/255

(Continued)

FOREIGN PATENT DOCUMENTS

JP    2007323441    12/2007
JP    2007323441 A * 12/2007

*Primary Examiner* — Laurie A Ries
(74) *Attorney, Agent, or Firm* — JCIPRNET

(57) ABSTRACT

An information processing apparatus includes: a processor configured to specify a first template document corresponding to a first document including a first document element, and a second template document corresponding to a second document including a second document element in a case where a relationship is set between the first document element and the second document element; set the relationship between a first template element which is a document element corresponding to the first document element among document elements in the first template document and a second template element which is a document element corresponding to the second document element among document elements in the second template document; and set the relationship between the document element corresponding to the first template element in a first duplicated document obtained by duplicating the first template document and the document element corresponding to the second template element in a second duplicated document obtained by duplicating the second template document in a case where the first duplicated document and the second duplicated document are created, after setting the relationship between the first template element and the second template element.

9 Claims, 13 Drawing Sheets

(51) Int. Cl.
*G06V 30/414* (2022.01)
*G06V 30/416* (2022.01)

(56) References Cited

U.S. PATENT DOCUMENTS

| | | | | |
|---|---|---|---|---|
| 2008/0072140 | A1* | 3/2008 | Vydiswaran | G06F 40/186 |
| | | | | 715/243 |
| 2012/0254730 | A1* | 10/2012 | Sunderland | G06F 40/186 |
| | | | | 715/234 |
| 2017/0220544 | A1* | 8/2017 | Masson | G06F 16/951 |
| 2018/0196802 | A1* | 7/2018 | Abou Mahmoud | G06F 40/131 |
| 2019/0286668 | A1* | 9/2019 | Puzicha | G06F 40/166 |
| 2020/0201894 | A1* | 6/2020 | Battiato | G06F 16/3331 |
| 2020/0394052 | A1 | 12/2020 | Cheng | G06F 3/0482 |
| 2022/0391356 | A1* | 12/2022 | Kraatz | G06F 16/137 |

* cited by examiner

FIG. 5

| DOCUMENT ID = "DOCUMENT A2" | | | |
|---|---|---|---|
| VERSION NUMBER | CREATION DATE AND TIME | CREATOR | DOCUMENT DATA |
| 1 | 11/15/2019 13:11 | SATO | ...... |
| 2 | 11/15/2019 14:23 | SATO | ...... |
| 3 | 11/20/2019 16:33 | SUZUKI | ...... |

FIG. 6

| OPERATION DATE AND TIME | OPERATOR | OPERATION TYPE | OPERATION PARAMETER |
|---|---|---|---|
| 11/15/2019 13:11 | SATO | DUPLICATING | DOCUMENT A → DOCUMENT B |
| 11/15/2019 13:15 | TANAKA | EDITING | DOCUMENT X |
| 11/15/2019 13:16 | KOBAYASHI | DOWNLOAD | DOCUMENT Y, KOBAYASHI'S TERMINAL |
| ..... | ..... | ..... | ..... |

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2020-006512 filed Jan. 20, 2020.

BACKGROUND

(i) Technical Field

The present invention relates to an information processing apparatus and a non-transitory computer readable medium storing a program therefor.

(ii) Related Art

As a method of creating an electronic document such as a document file, a method of adding or changing a template is often used. In addition to the template data provided in the template-specific data format, a duplicate of an existing document may be used as the template.

Further, information about the relationship between a document or a document element and another document or a document element is also stored and used. The document element is an element that constitutes a document, and conversely, a document includes one or more document elements.

In the system disclosed in JP2007-323441A, in a case where a duplicate source document is selected by a user, a duplicate source document group to which the selected document belongs is compared with a successive document group created on the basis of the duplicate source document group. Then, in addition to the image showing the structure of the duplicate source document group, the structural difference between the duplicate source document group and the successive document group is indicated by a symbol. The user selects a wanted document from the documents and presses the register button. As a result, the document group including the association between documents is duplicated. In JP2007-323441A, as an example of the association between documents, the association between documents in the case where a plurality of documents form a structure such as an ISO document group is shown.

SUMMARY

Aspects of non-limiting embodiments of the present disclosure relate to an information processing apparatus and a non-transitory computer readable medium storing a program that a configuration capable of reflecting the relationship in corresponding document elements in the documents duplicated from the template documents even in a state where the same relationship is not explicitly set in the template documents of the documents in a case where a relationship is set to the document elements between documents.

Aspects of certain non-limiting embodiments of the present disclosure address the above advantages and/or other advantages not described above. However, aspects of the non-limiting exemplary embodiments are not required to address the advantages described above, and aspects of the non-limiting exemplary embodiments of the present disclosure may not address advantages described above.

According to an aspect of the present disclosure, there is provided an information processing apparatus including: a processor configured to specify a first template document corresponding to a first document including a first document element, and a second template document corresponding to a second document including a second document element in a case where a relationship is set between the first document element and the second document element; set the relationship between a first template element which is a document element corresponding to the first document element among document elements in the first template document and a second template element which is a document element corresponding to the second document element among document elements in the second template document; and set the relationship between the document element corresponding to the first template element in a first duplicated document obtained by duplicating the first template document and the document element corresponding to the second template element in a second duplicated document obtained by duplicating the second template document in a case where the first duplicated document and the second duplicated document are created, after setting the relationship between the first template element and the second template element.

BRIEF DESCRIPTION OF THE DRAWINGS

Exemplary embodiment(s) of the present invention will be described in detail based on the following figures, wherein:

FIG. 5 is a diagram showing an example of contents of version management information;

FIG. 6 is a diagram showing an example of contents of operation history information;

DETAILED DESCRIPTION

In the following description, an electronic document such as a document file is simply called a document. Further, each document is assumed to include one or more document elements. For example, the document may be described in a markup language such as a hyper text markup language (HTML) capable of describing the structure formed by the document element group, or may be text data of which a document structure such as a chapter, a section, or a paragraph is described in accordance with a predetermined rule.

Figure 1:
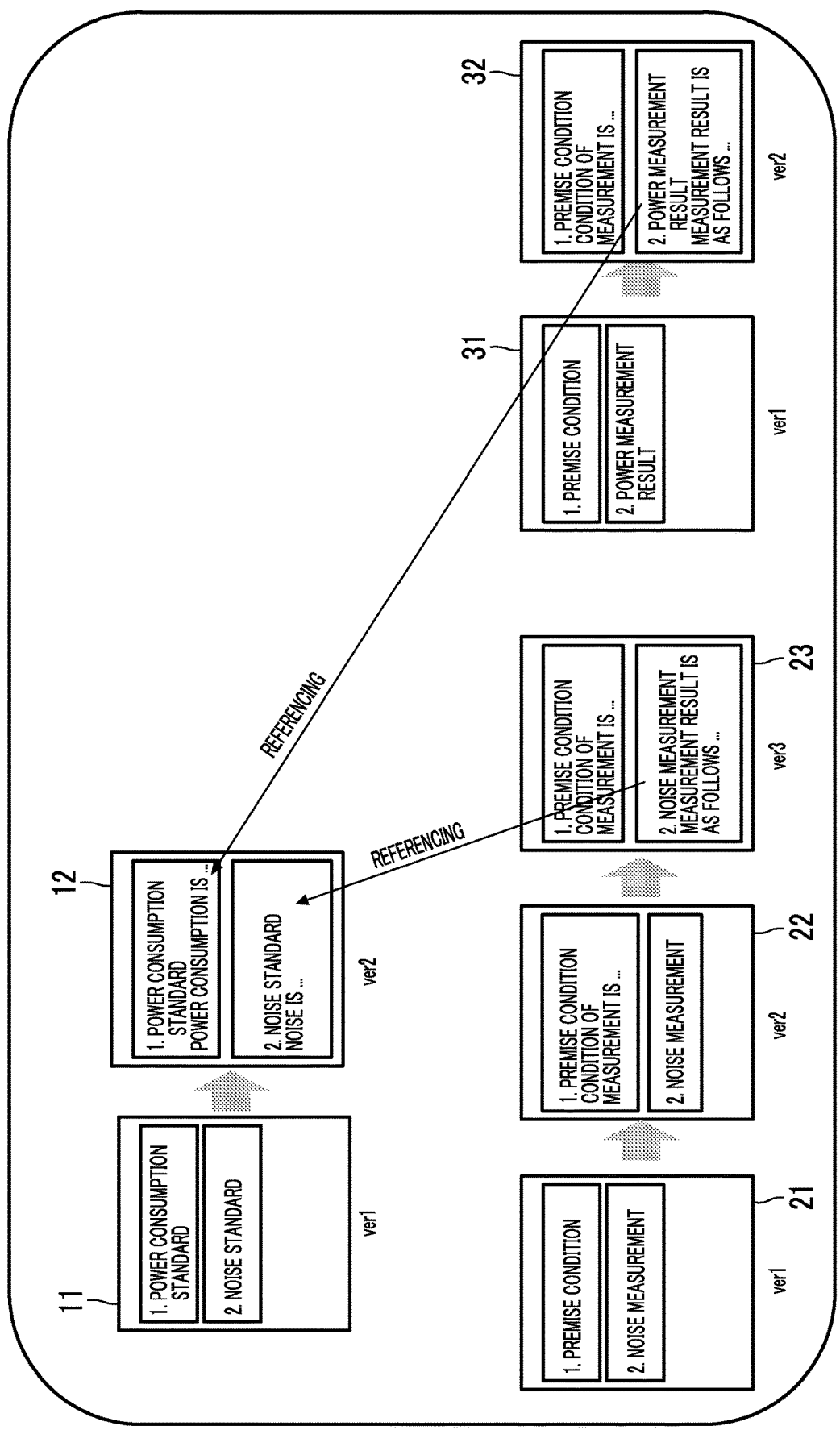
FIG. 1 is a diagram for explaining an example in which a relationship is set to document elements of a document of which the version is upgraded through editing.

FIG. 1 shows an example in which a relationship is set to document elements in a document created from a template. In this example, a template document 11 includes a first document element having the heading "1. Power consumption standard" and a second document element having the heading "2. Noise standard". A document 12 is created by adding text contents such as "power consumption is . . . " and "noise is . . . " to each document element of the template document 11. In a case where the document editing environment has a version management function, the version number of the template document 11 is 1 (indicated as "Ver1" in the drawing), and the version number of the document 12 is 2. Similarly, by adding the text contents to the first document element of another template document 21, a document 22 that is version 2 of this document is created. By adding the text contents of the second document element to the version 2, the document 23 which is version 3 of this document is created. Further, the text contents are added to each of two document elements of another template document 31. Therefore, the document 32 which is the version 2 of this document is created.

Here, it is assumed that the relationship that the second document element of the document 23 "references" the second document element of the document 12, and the relationship that the second document element of the document 32 "references" the first document element of the document 12 are set by identical or different users. The data indicating the relationship between the document elements may be included, as attribute data of the current document or the current document elements, in the document, or may be registered in the document management system, which manages the documents, separately from the individual documents.

In this case, for example, in a case where the document 23 is duplicated to create a new document, the relationship that the second document element of the new document "references" the second document element of the document 12 is automatically set. The setting can be performed by the related art. Further, in a case where a group of documents consisting of the documents 12, 23 and 32 are collectively duplicated to create three new documents, between the document elements of these three documents, the relationship between the document elements of the duplicate source document group is duplicated and automatically set. The duplicating and setting can be performed by the related art.

In some cases, the relationship, which is set to the document elements in the individual documents 12, 23, and 32 created from the template document as described above, may also be reflected in the document elements in the original template document. However, no technique has been known so far for facilitating the reflection of the relationship in such a template document.

The exemplary embodiments described below exemplify methods of reflecting the relationship, which is set between the document elements of the individual documents, in the document elements of the template document which is the base of the individual documents.

Figure 2:
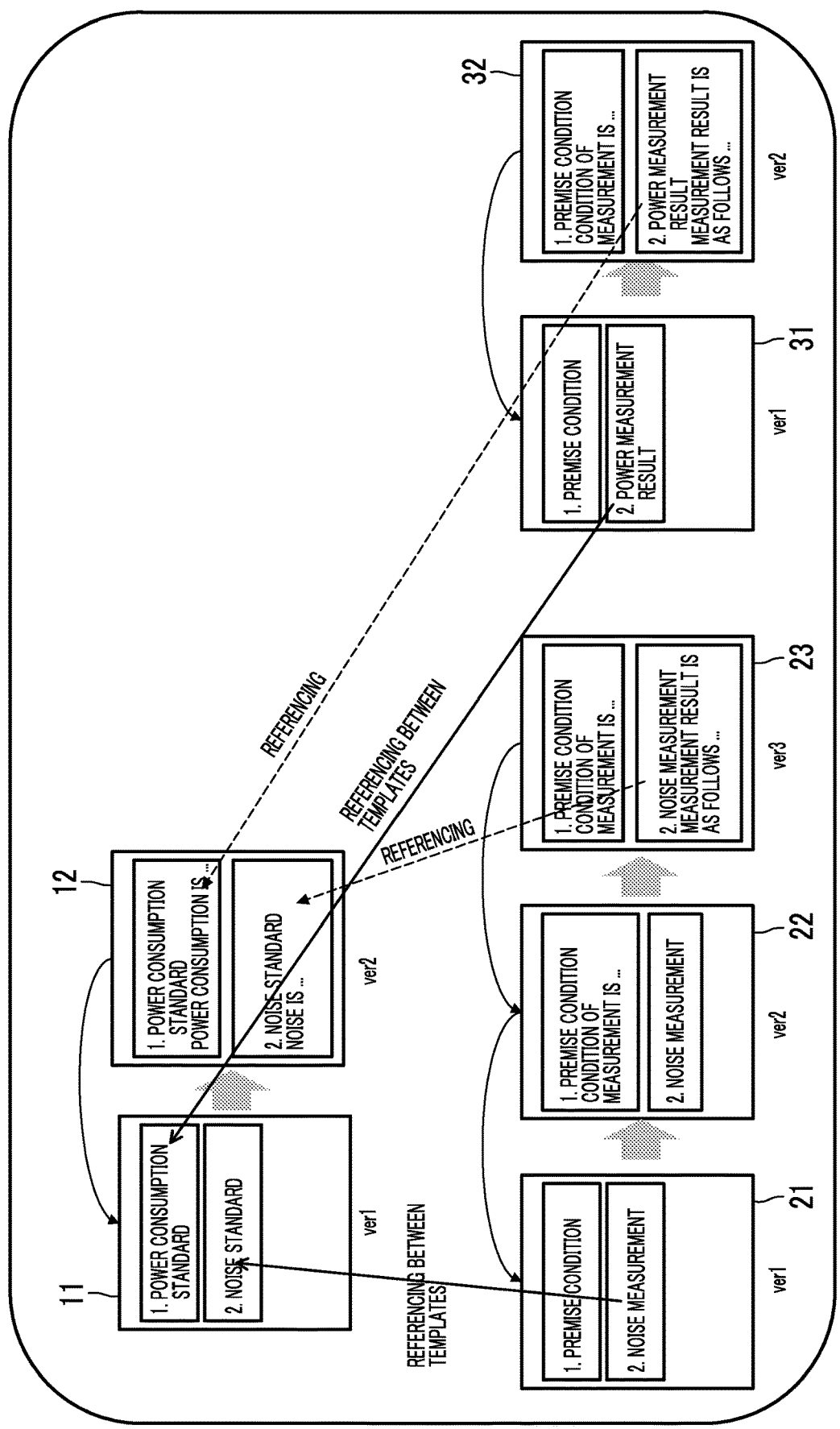
FIG. 2 is a diagram for explaining specifying a template of a document including a document element to which a relationship is set and setting a relationship between the document elements of the template.

An overview of this method will be described with reference to FIG. 2. In the example of FIG. 2, the same "reference" relationship as in the case of FIG. 1 is set between the document elements of the latest versions of the documents 12, 23 and 32 among the same documents 11 to 32 as shown in FIG. 1.

The system according to the present exemplary embodiment reverts back the version management information of each of the documents 12, 23 and 32, the operation history such as the editing history, and the like, thereby specifying the template documents 11, 21, and 31 corresponding to the respective documents 12, 23 and 32. Further, the system specifies that the first document element and the second document element of the specified template document 11 respectively correspond to the first document element and the second document element of the latest-version document 12. This specification may be performed on the basis of, for example, the identification information of the document elements included in the document elements in the documents 11 and 12. This identification information may be, for example, a text string of the heading of the document element. In a case where the document is described in the markup language, the identification information of the document element may be described in the markup (for example, HTML tag) indicating the range of the document element. Similarly, the system specifies that the second document element of the latest-version document 23 corresponds to the second document element of the template document 21, and the second document element of the latest-version document 32 corresponds to the second document element of the template document 31. Then, on the basis of these results of the specification, the system sets a "reference" relationship to the first document element of the template document 11 from the second document element of the template document 31 in accordance with the "reference" relationship to the first document element of the document 12 from the second document element of the document 32. Similarly, the system may set a "reference" relationship to the second document element of the template document 11 from the second document element of the template document 21 in accordance with the "reference" relationship to the second document element of the document 12 from the second document element of the document 23.

In the example shown in FIG. 2, it is assumed that individual documents are created by sequentially editing the template document. In this example, the oldest version, which is specified by reverting back the version of the document including the document element to which the relationship is set, is the template document corresponding to the document.

However, the oldest version, which is reached by reverting back the version of the document, may not be appropriate as a template document for the document. A typical example is that the oldest version is created by duplicating a separate document.

For example, a method is often used in which a duplicated document is created by duplicating a certain document, and the wanted document is created by editing the duplicated document. In a case where the oldest version reached by reverting back the version of the document including the document element to which the relationship is set is a duplicate of the separate document, the separate document as the duplicate source rather than the oldest version or the oldest version of the separate document is more appropriate as a template document.

Figure 3:
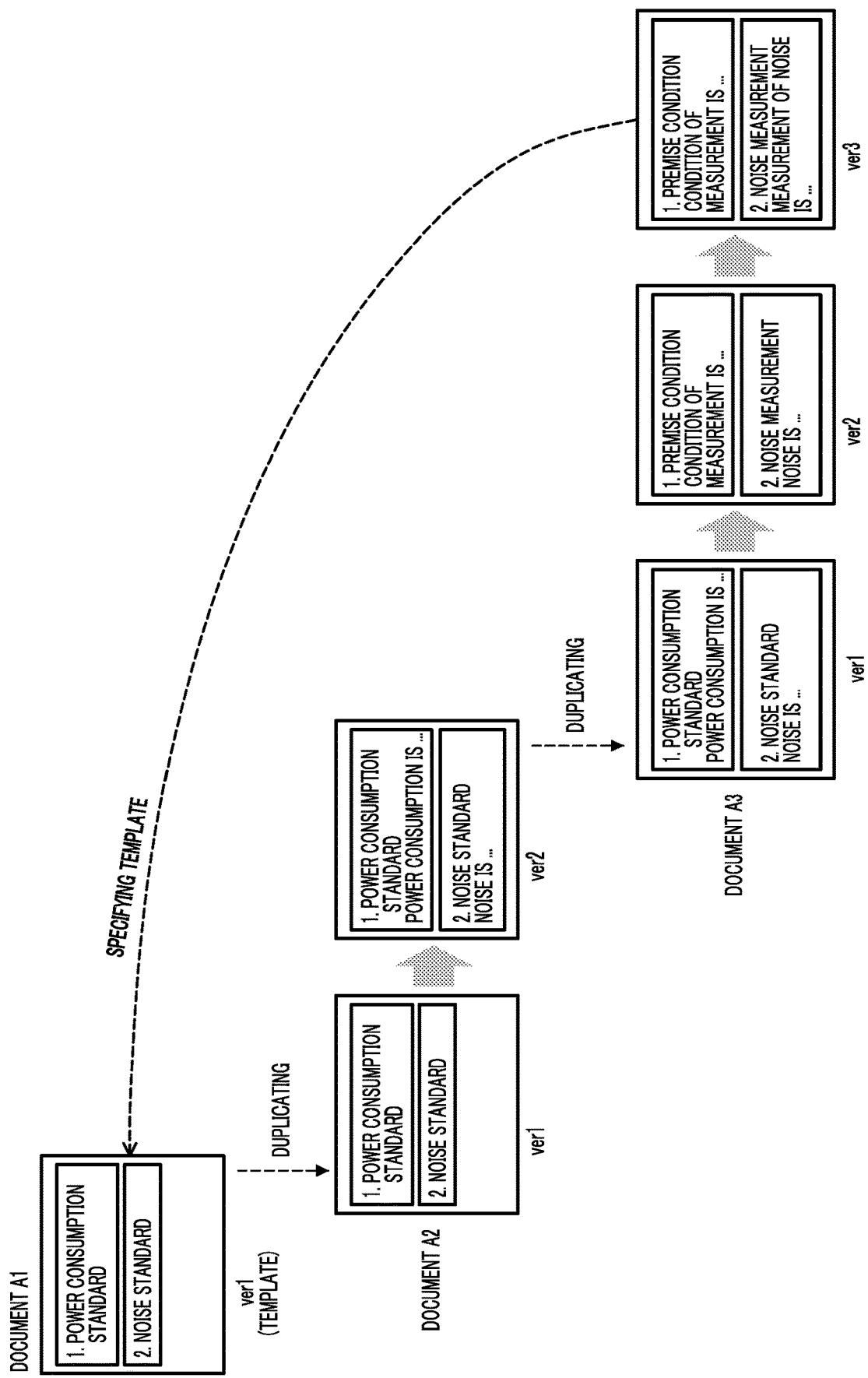
FIG. 3 is a diagram showing an example in which not only a version but also a duplicate of a document are reverted back to specify a template.

In the example shown in FIG. 3, the version 1 of the document A2 is created by duplicating the document A1 which is a template document including only the heading of each document element, and the version 2 is created by adding the editing for adding the contents of each document element to the version 1. The version 1 of the document A3 is created by duplicating the version 2 of the document A2. Then, the version 2 is created by editing the contents of each document element of the version 1 of the document A3, and the version 3 is created by further editing this version 2. In this example, for example, it is considered that the first document element in the version 3 of the document A3 is set to have a relationship to another document element, and this relationship is reflected in the corresponding document element in the template document corresponding to the document A3. For this purpose, it is necessary to specify the template document corresponding to the document A3 (version 1 of the document A1 in this example).

In this specifying processing, the system reaches version 1 of the document A3 by reverting back the version sequentially from the version 3 of the document A3 including the document element to which the relationship is set. In a case where the system stores the history of the document duplicate operations and the duplicate relationship between documents, the version 1 of the document A3 is duplicated, and the version 2 of the document A2 is specified as the duplicate source. The system reaches version 1 of the document A2 by reverting back the version of the document A2 and specifies that the version 1 is a duplicate of version 1 of the document A1. Then, the system specifies that the document A1 does not have a version older than the version 1 and the version 1 is not a duplicate of a separate document, and determines that the version 1 of the document A1 is a template document, on the basis of the result of the specification. Then, the relationship between other document elements and the first document element in the specified template document is set.

The document A1, the document A2, and the document A3 shown in FIG. 3 are separate documents having different document IDs. The ID is identification information. The document ID is identification information uniquely assigned to each document by the document management system. Each version of the same document has the same document ID, but version numbers different from each other.

Example of Hardware Configuration

The function of reflecting the relationship, which is set between the document elements of the individual documents, described above between the document elements of the template document is incorporated in, for example, a document editing system that provides a document editing environment.

The function is implemented by causing a computer to execute a program representing the function. A program representing the function may be installed in a computer in which the document editing system is installed, for example, as a part of the system.

Figure 4:
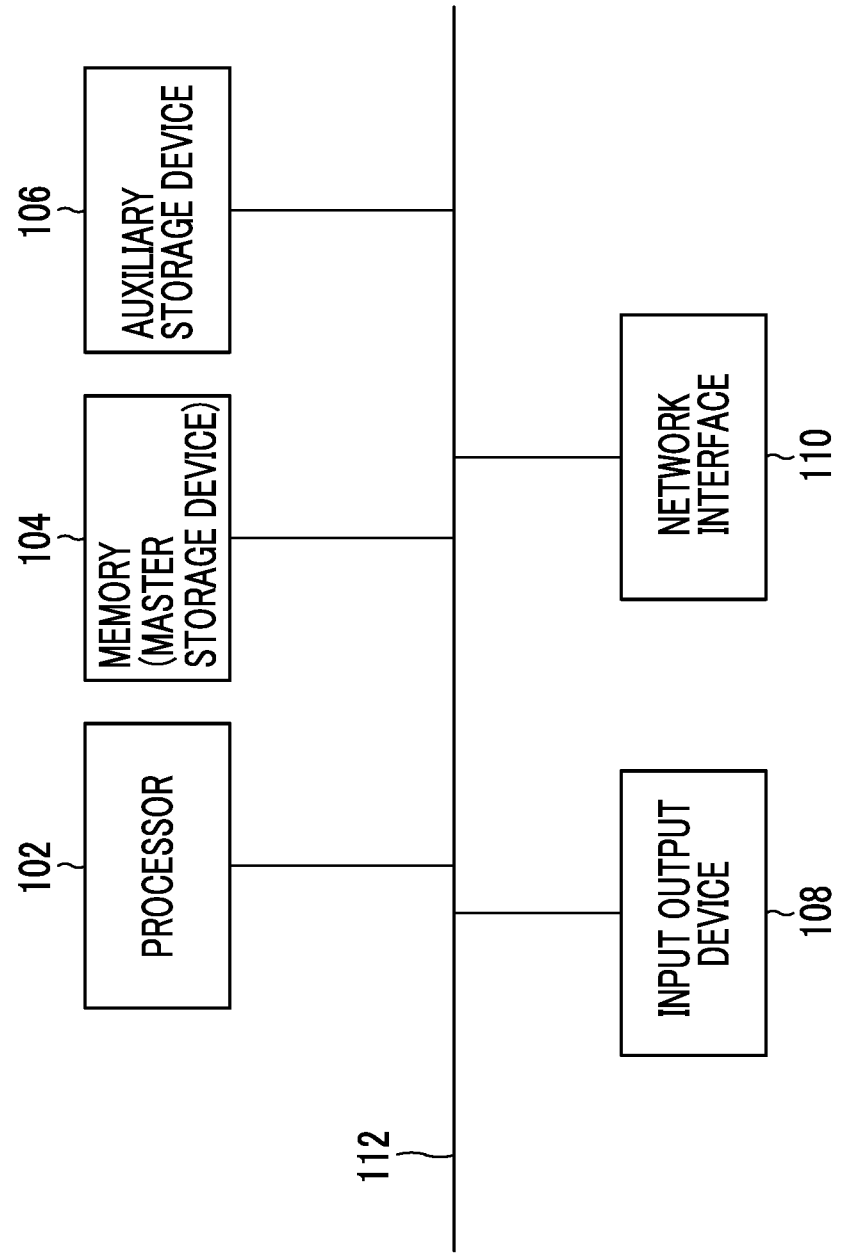
FIG. 4 is a diagram showing a hardware configuration of a computer.

Here, as shown in FIG. 4, the computer has a circuit configuration in which the following elements as hardware are connected via a data transmission path such as a bus 112. The elements includes: a processor 102; a memory (master storage device) 104 such as a random access memory (RAM); a controller that controls an auxiliary storage device 106 such as a flash memory, a solid state drive (SSD), or a hard disk (HDD); an interface with various input output devices 108; a network interface 110 that performs control for connection with a network such as a local area network; and the like. A program in which the processing content of the function for reflecting the above-described relationship is described is installed in a computer through a network or the like and stored in the auxiliary storage device 106. The program stored in the auxiliary storage device 106 is executed by the processor 102 using the memory 104. Therefore, the processing of reflecting the relationship in the template document by the above-described function is implemented.

In the embodiments above, the term "processor" 102 refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" 102 is broad enough to encompass one processor 102 or plural processors 102 in collaboration which are located physically apart from each other but may work cooperatively. The order of operations of the processor 102 is not limited to one described in the embodiments above, and may be changed.

Further, the auxiliary storage device 106 stores various kinds of information for the processing of reflecting the relationship in the template document. Examples of such information include version management information exemplified in FIG. 5 and operation history information exemplified in FIG. 6.

The version management information exemplified in FIG. 5 is management information of each version of the document whose document ID is "document A2". The version management information includes items such as a version number, creation date and time, a creator, and document data for each version of the current document. The version number is a number that specifies the current version. In the example shown in the drawing, a serial number that is an integer of 1 or more is used as the version number. However, this is merely an example, and any numbering system may be used for the version number as long as it is possible to detect the order relationship between the versions in the identical document through the numbering system. The creation date and time is the date and time in a case where the current version is created. Here, the first (that is, oldest) version of a document is created entirely new or created by duplicating an existing document, while other versions are created through revision of the existing versions. The user ID of the user who performs the operation of creating the current document on the document editing system is registered in the creator field. In the field of the document data, the document data itself of the current version or information for specifying the document data stored in the auxiliary storage device 106 or the like (for example, a link to the document data) is registered. Similar version management information is stored in the auxiliary storage device 106 for each document ID.

The operation history information shown in FIG. 6 is information indicating a history of operations performed by each user on the document editing system. FIG. 6 exemplifies some records, which are stored during a certain period, among the plural history records included in the operation history information. Each history record includes items such as operation date and time, an operator, an operation type, and an operation parameter. The operation date and time is the date and time in a case where the system executes the operation that is the target of the current history record. The operator is the ID of the user who gives an instruction to execute the current operation. The operation type is the type of the current operation. The operation types include duplicating, editing, downloading (that is, downloading a document from the system to the user's terminal), and the like. The operation parameter is a parameter that defines the content of the current operation. In the case of the duplicate operation, the operation parameter is a set of the document ID of the duplicate source document and the ID of the duplicate destination document created through duplicating from the duplicate source document. In the example shown in the drawing, the operation parameters of the duplicate operation relating to the first history record indicate that the duplicate source document is the document A and the duplicate destination document is the document B. The editing operation parameter may include the document ID of the document to be edited, and may further include the version number of the version created as a result of the editing.

Example of Processing Procedure

Figure 7:
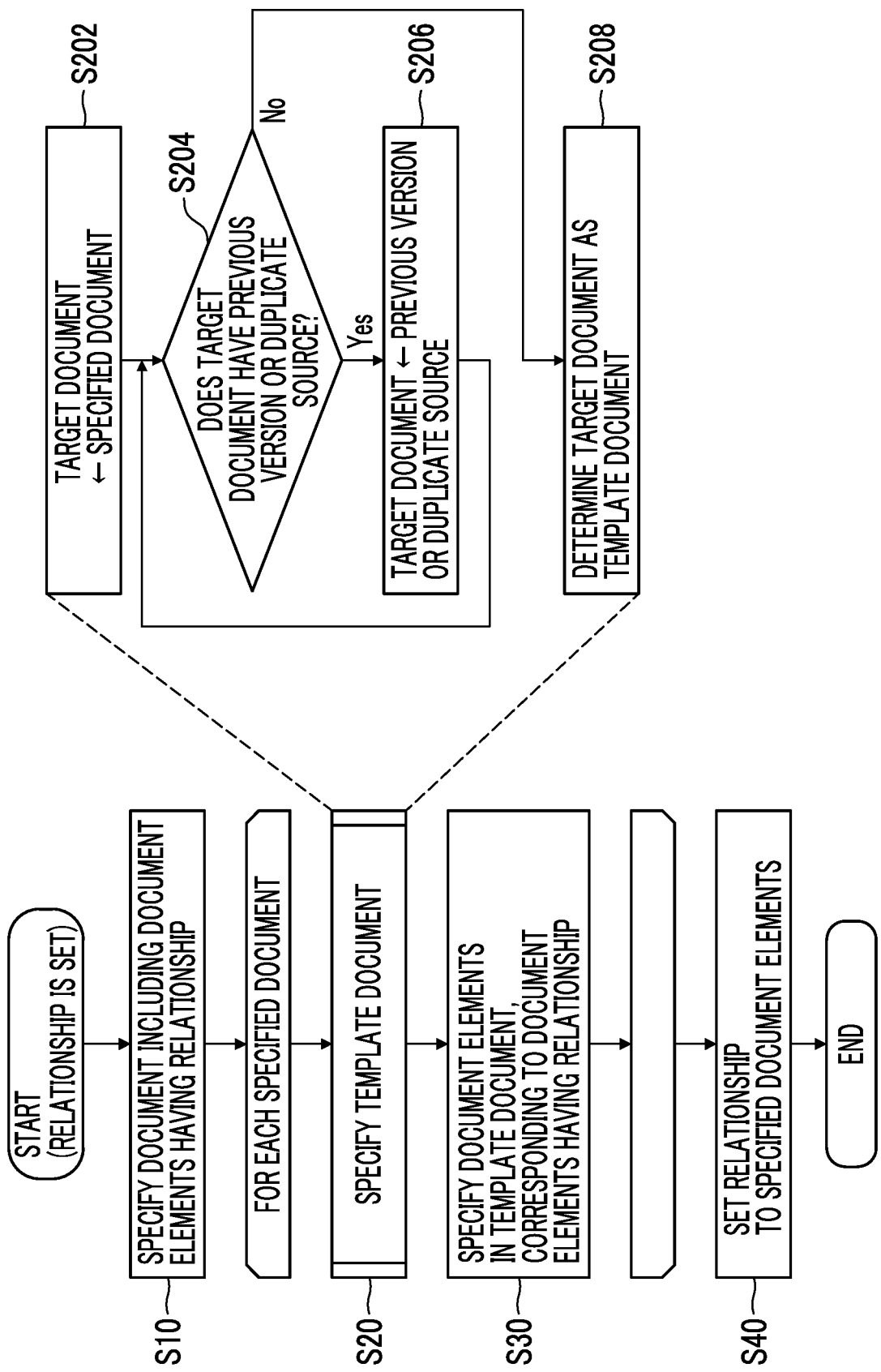
FIG. 7 is a diagram showing a processing procedure executed by a processor for the document editing system or a template management function thereof.

Next, with reference to FIG. 7, an example of a processing procedure executed by the processor 102 to implement the template management function described above will be described. The procedure of FIG. 7 is executed, for example, in a case where the user sets a relationship to the document elements. The setting of this relationship is performed using the UI screen 200 shown in FIG. 8, for example.

Figure 8:
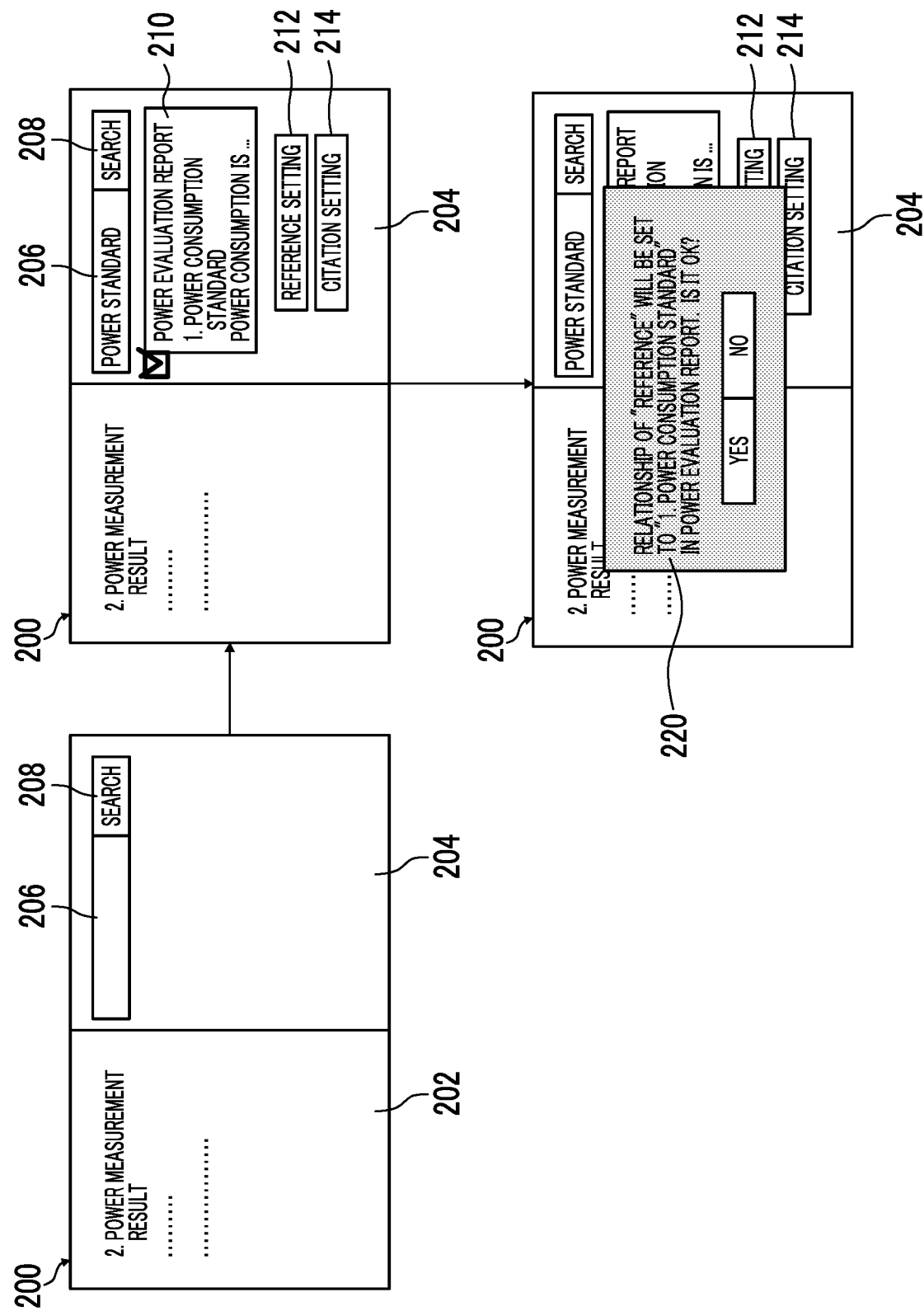
FIG. 8 is a diagram schematically showing a UI screen for setting a relationship between document elements.

In the example of FIG. 8, the content of the document element that is the source of the relationship to be set is displayed in the first display field 202 on the left side of the user interface (UI) screen 200. For example, in a case where the user selects a wanted document element in the document being edited by the document editing system and gives an instruction to execute the operation for setting the relationship, this UI screen 200 is displayed, and the content of the document element selected in the first display field 202 in the UI screen 200 is displayed. Further, in the second display field 204 on the right side of the UI screen 200, an input field 206 for inputting search conditions for searching for a document element that is a destination of a relationship to be set, and a search button 208 are displayed. In a case where the user inputs a search condition in the input field 206 and presses the search button 208, the processor 102 searches the database, in which the document group is stored, for a document element that satisfies the search condition. In the search result display field 210 below the input field 206, for example, the searched document element groups are displayed side by side in descending order of levels of satisfaction of the search condition. A check box for selecting the destination of the relationship is displayed for each searched document element. In order to avoid complexity, FIG. 8 shows only one document element of the search result. Below the search result display field 210, buttons 212 and 214 giving instructions to set the relationships are displayed. The buttons 212 and 214 are buttons respectively giving instructions to set a "reference" relationship and a "quotation" relationship to the selected document element in the search result display field 210 from the document element displayed in the first display field 202. The distinction between "reference" and "quotation" is defined in advance. In the example shown in the drawing, the user presses the button 212 in a state where the document element "1. Power consumption standard" in the document "power evaluation report" in the search result display field 210 is selected. Thereby, a dialog 220 is displayed on the UI screen 200 to inquire whether to set the "reference" relationship to the document element "1. Power consumption standard" in the document "power evaluation report". In the dialog 220, a "Yes" button giving an instruction to perform the setting and a "No" button giving an instruction not to perform the setting are displayed. In a case where the user presses the "Yes" button, the processor 102 sets a "reference" relationship to "1. Power consumption standard" which is a document element in the selected document "power evaluation report" that is the relationship destination from the document elements of the relationship source displayed in the first display field 202. The information about the set reference relationship is registered in, for example, a database that holds the relationship between document elements.

Here, an example has been shown in which the user sets a relationship between the document elements of individual documents, but this is only an example. Alternatively, some document analysis system may analyze each document element and set a relationship between the document elements on the basis of the analysis result. Then, the procedure of FIG. 7 may be started with the trigger that the document analysis system sets the relationship between the document elements.

The description returns to FIG. 7. In a case where the relationship between the document elements is set as described above, the processor 102 specifies the document including the document element of the relationship source of the relationship and the document including the document element of the relationship destination (S10). In step S10, the document ID and the version of the document including the document element of the relationship source or the relationship destination are specified. Then, the processing of steps S20 and S30 is executed for each specified document. In step S20, the processor 102 specifies a template document corresponding to the specified document. A detailed example of the processing of step S20 will be described later. Next, the processor 102 specifies the document element corresponding to the document element of the relationship source or the relationship destination among the document elements in the specified template document (S30). Thereby, the document element corresponding to the relationship source in the template document of the document including the document element of the relationship source is specified, and the document element corresponding to the relationship destination in the template document of the document including each document element of the relationship destination is specified. The processor 102 sets the relationship between the document element corresponding to the relationship source and the document element corresponding to the relationship destination in each of the specified template documents (S40). The information about the set relationship is registered in, for example, a database that holds the relationship between the document elements.

Next, a detailed procedure of step S20 will be exemplified. The processor 102 first sets one of the documents specified in S10 as a target document (S202). Next, the processor 102 determines whether or not a previous version document or a duplicate source document is present in the target document (S204). In step S204, the processor 102 checks whether a version number before the version number of the target document is present, for example, by referencing the version management information (refer to FIG. 5) corresponding to the document ID of the target document. As a result of the checking, in a case where the previous version number is not present, the processor 102 searches for the history record of the duplicate operation, in which the pair of the document ID and the version number of the target document as the duplicate destination is included in the operation parameter, from the operation history information (refer to FIG. 6), and specifies the document ID and the version of the duplicate source document included in the operation parameter. In such a manner, in step S204, in a case where the previous version of the target document or the duplicate source document of the target document is present, the previous version document or the duplicate source document is specified.

In a case where the determination result in step S204 is Yes, the processor 102 changes the target document to the specified previous version or duplicate source document (S206), and repeats the processing of step S204. In a case where the determination result of S204 is Yes, the processor 102 determines that the target document at that time is the template document corresponding to the document specified in S10 (S208).

As described above, through the processing procedure shown in FIG. 7, the template document of each document including the document element to which the relationship is set is specified, and the relationship is set to the document elements corresponding to the document elements in the template documents are specified.

In a case where the version (k+1) is created by editing the version k (k is a positive integer) of a certain document X, it would appear that the relationship between the version k and the version (k+1) is a parent-child relationship in which the former is a parent and the latter is a child thereof. Similarly, in a case where version 1 of a separate document Z is created by duplicating version m of the document Y, it would appear that the relationship between the version m of the document Y and the version 1 of the document Z is a parent-child relationship in which the former is a parent and the latter is a child thereof. In such a case, the processing of step S204 is processing of determining whether or not the target document has a parent. Then, step S206 is processing of making the parent of the current target document a new target document for the next steps S204 and S206. In step S10, a document including document elements having a relationship set by the user is specified, and the document is set as the first target document. The first target document is reverted back to the root thereof, and the target document in a case where the document cannot be reverted back any more, in other words, the first root of the first target document, is specified as a template document in S208.

In the above, the procedure of FIG. 7 is executed by the trigger that the user (or the document analysis system) sets the relationship between the document elements, but this is merely an example. Alternatively, for example, the user may instruct the document editing system to start executing the processing procedure of FIG. 7 at an optional timing. In this case, in a case where the document editing system receives an execution start instruction from the user, the document editing system acquires the relationship, which is set between the document elements, from the database, and executes the processing procedure of FIG. 7 on the relationship.

Another Example of Template Specification (1) First Case where Problem Occurs in Processing of FIG. 7

There is a document editing mode in which a blank document is temporarily stored and the structure and contents of the document element group are added to the blank document.

Figure 9:
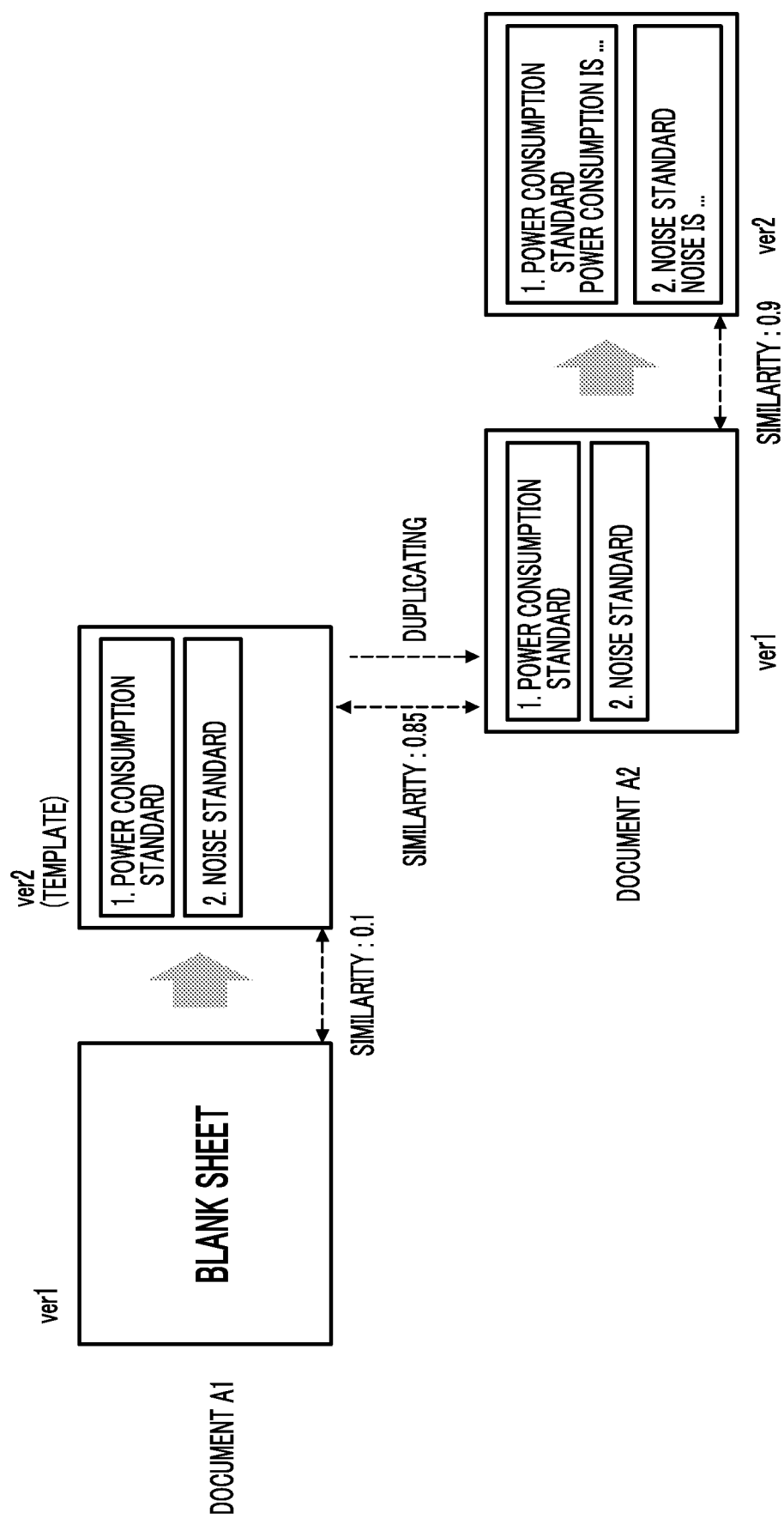
FIG. 9 is a diagram for explaining a case where a problem occurs in the template specifying procedure shown in FIG. 7.

For example, in the example shown in FIG. 9, a blank document is once created as the version 1 of the document A1, and headings of two document elements of "1. Power consumption standard" and "2. Noise standard" are input to the version 1. Thereby, the version 2 of the document A1 is created. The version 1 of the document A2 is created by duplicating the version 2, and the version 2 of the document A2 is created by inputting the text contents of each document element to the version 2. In a case where the relationship about the document element of version 2 of the document A2 is set, the template document is specified by reverting back the version in accordance with the history of the version group and duplicating from the version 2 as a start point. In a case where the procedure of FIG. 7 is used for this specification, the version 1 of the blank document A1 is specified as the template document. Since the blank sheet does not include the document element, the relationship cannot be set even in a case where the blank sheet is used as a template document.

In addition, in a case where a common form that includes a company name, a company logo, and the like as a header or a footer is provided for the document used in the business of the company, the common form may be duplicated once, and the document editing may proceed from the duplicate of the common form used as the start point. Even in the document editing mode using such a common form, the same problem as in the case of the blank sheet described above may occur.

(2) Second Case where Problem Occurs in Processing of FIG. 7

It can be said that a template document is a template in a case where plural individual documents are created on the basis of the template document.

While version 1 of a document does not have one duplicate created, version 2 may have plural duplicates created. In this case, there are plural individual documents based on the version 2, but there is no single individual document based on the version 1. Therefore, in this case, the version 2 is more appropriate as a template document than the version 1. However, even in such a case, the version 1 is selected as the template document in the processing procedure of FIG. 7.

As described above, in the processing procedure of FIG. 7, a document that is not often used as a template for other documents may be specified as a template document.

(3) Example of Improved Processing

An example of processing of dealing with the above problem will be described below.

In this improved processing, the processor 102 obtains the similarity between the target document and the previous version thereof or the duplicate source thereof in specifying the template document (step S20 in FIG. 7). In the processing of reverting back to the previous version or the duplicate source of the document, at the time point where the calculated similarity is less than the predetermined similarity threshold value, the processor 102 stops reverting back the document any more, and selects a template document from documents including the reverted-back documents which are set as target documents up to the time point. In one example, the similarity between the target document and the previous version or the duplicate source is the similarity of the document structures therebetween. In this example, in the similarity calculation, structural characteristics of the document, for example, a list of the document elements included in the document (for example, a column of IDs of these document elements) and a heading text string of these document elements are considered. However, the text contents of these document elements are not considered. The example is based on the idea that document structure is necessary for the template document. The similarity between the document structures of documents may be obtained by a method in the related art. As another example, the text contents of the document elements may be taken into consideration in the above similarity calculation.

For example, in the example of FIG. 9, it is assumed that the similarity between the version 2 of the document A2 and the version 1 previous by one version thereto is 0.9, and the similarity between the version 1 thereof and the version 2 of the document A1, which is the duplicate source, is 0.85. Further, it is assumed that the similarity between the version 2 of the document A1 and the version 1 previous by one version thereto is 0.1. In a case where the similarity threshold value is set to 0.6, it is possible to revert back from the version 2 of the document A2 as the start point to the version 1 of the same document, and further to the version 2 of the duplicate source document A1 of the version 1. Since the similarity between the version 2 of the document A1 and the version 1 previous thereto is 0.1, the version does not revert back to the version 1 of the document A1. Therefore, the end point of the reverting back is version 2 of the document A1. The processor 102 specifies, as a template document, a document in which a large number of duplicates appropriate for the template document are created among the documents from the start point to the end point. Whether or not the number of created duplicates corresponds to a large number appropriate as a template document may be determined by, for example, whether or not the number of duplicates is equal to or greater than a predetermined threshold value of the number of times of duplication. Further, as another example, among the documents from the start point to the end point, the document with the maximum number of times of duplication may be determined as the template document.

The number of times of duplication of each version of each document may be obtained from the operation history information (refer to FIG. 6). Further, a table for managing the number of times of duplication may be provided for each version of each document. In this case, in a case where the user gives an instruction to duplicate a certain version of a document, the document editing system may increase the number of times of duplication of the version of the document in the table by 1.

Figure 10:
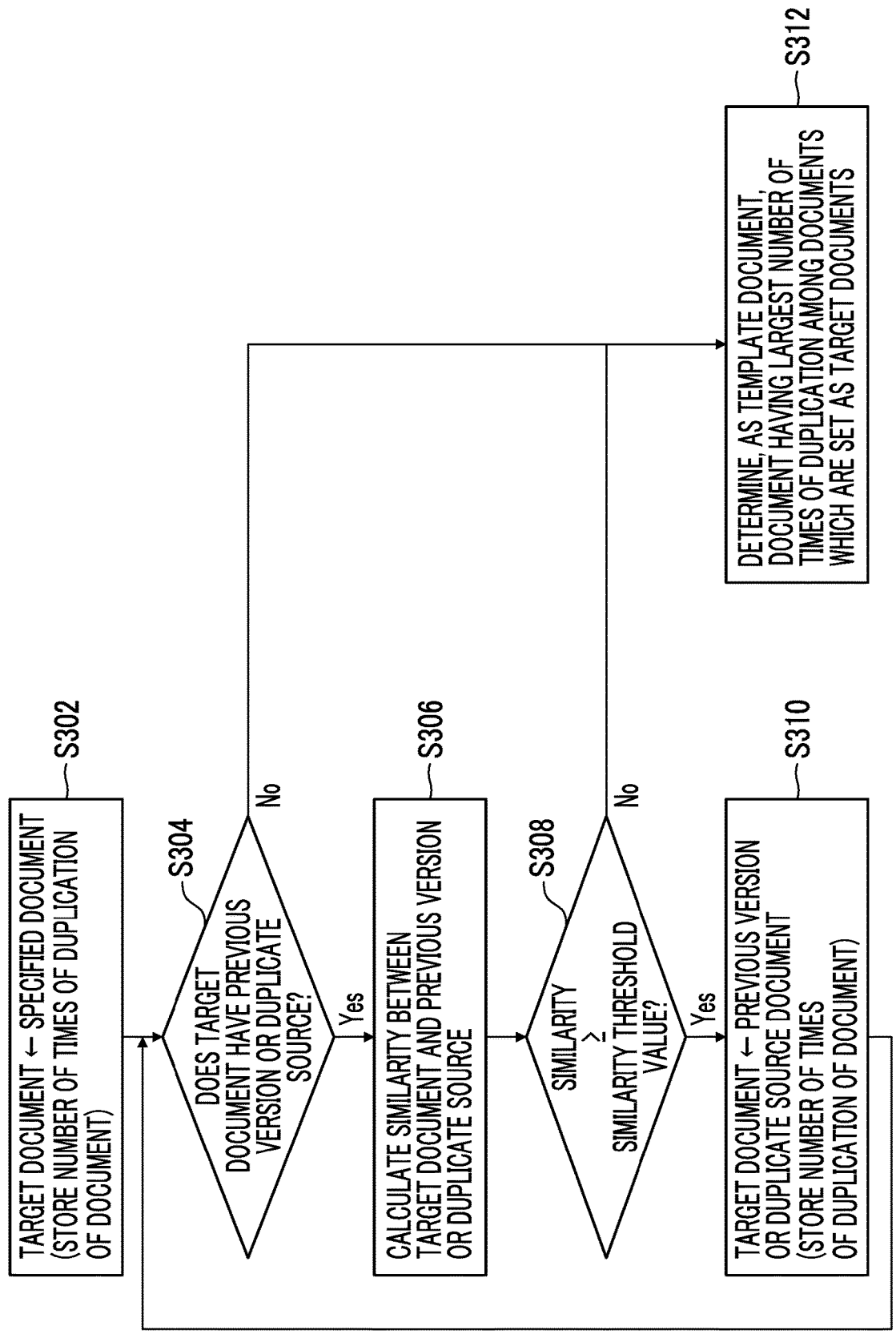
FIG. 10 is a diagram exemplifying a procedure for specifying a template in consideration of the similarity and the number of times of duplication.

The processing procedure executed by the processor 102 in this example is as shown in FIG. 10, for example. The procedure of FIG. 10 is an example of the detailed procedure of step S20 of the procedure of FIG. 7.

In this procedure, the processor 102 sets the document specified in step S10 of the procedure of FIG. 7 as the target document, obtains the number of times of duplication of the target document, and stores the obtained number of times of duplication in the memory 104 (S302). Next, the processor 102 determines whether or not a previous version document or a duplicate source document is present in the target document (S304). In a case where the result of the determination in step S304 is Yes, the processor 102 calculates the similarity between the target document and the parent thereof, that is, the document of the version previous by one version thereto or the duplicate source document (S306). Here, the similarity between the parts excluding the text contents may be calculated. The processor 102 determines whether or not the calculated similarity is equal to or greater than a predetermined similarity threshold value (S308). In a case where the result of this determination is Yes, the parent obtained in S304, that is, the previous version document or the duplicate source document is set as a new target document (S310). At this time, the processor 102 obtains the number of times of duplication of the new target document and stores the number in the memory 104. Then, the processor 102 repeats the steps after step S304.

In a case where the determination result of either step S304 or S308 is No during this repetition, the processor 102 determines, as a template document, a document, of which the stored number of times of duplication is largest, among the documents which are set as the target documents after S302 (S312).

In the procedure of FIG. 10, the document having the largest number of times of duplication among the documents which are set as target documents is selected as a template document, and as another example, a document, of which the number of times of duplication is equal to or greater than a predetermined threshold value of the number of times of duplication, may be selected as the template document. In this case, a plurality of template documents may be selected.

Duplication of Relationship Set in Template

The relationship reflected in the document elements of the template document as described above is reflected in the document elements of the document group created by further duplicating the template documents.

Figure 11:
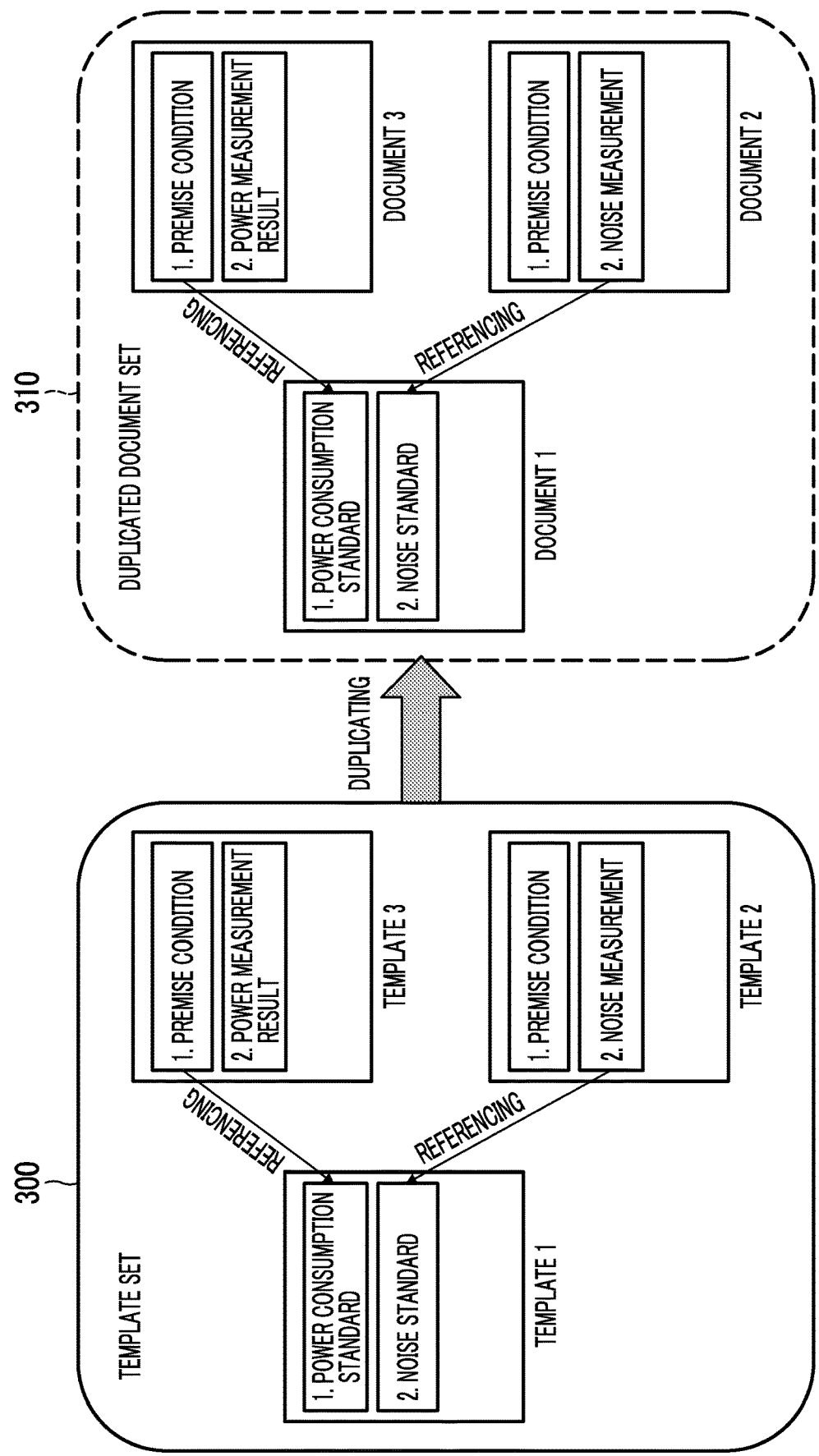
FIG. 11 is a diagram for explaining that, in a case where a set of template documents in which the relationship between document elements is reflected is duplicated, the same relationship is also reflected in the document elements of the documents as a duplication result.

For example, as shown in FIG. 11, a case where there is a template set 300 including three template documents referred to as "template 1", "template 2", and "template 3" is considered. In this example, the reference relationship is set to the first document element of "template 1" from the first document element of "template 3", and the reference relationship is set to the second document element of "template 1" from the second document element of "template 2". A template set is a set consisting of plural template documents, and a relationship with the document element in the template document in the set may be set between the document elements in the template documents and the document elements in the template documents in the set. However, the condition that the relationship with the document element of the document not included in the set is not set is satisfied. In this sense, the relationship among the document elements in the template set is "closed" in the set.

The document editing system specifies a template set as follows, for example. That is, the document editing system gives an attribute indicating a template to the document group determined as the template documents through the procedure of FIGS. 7 and 10. Then, the document editing system specifies a group of documents, in which the relationship between the document elements is "closed" as described above, from the groups of documents having the template attributes (that is, the template documents), and stores the group of documents as a template set. A parent population of a large number of template documents included in a document editing system may include a plurality of template sets. The document editing system may, for example, provide the user with a list of the plurality of template sets, and receive the selection of the template set to be duplicated from the user.

In a case where the user gives an instruction to duplicate the template set 300, the document editing system creates "document 1" as a duplicate of "template 1", "document 2" as a duplicate of "template 2", and "document 3" as a duplicate of "template 3". The document editing system may manage the three duplicated documents as one duplicated document set 310. The document editing system duplicates the relationship between the same document elements as the template set 300 among "document 1", "document 2", and "document 3". That is, the document editing system sets a reference relationship to the first document element of "document 1" from the first document element of "document 3", and sets a reference relationship to the second document element of "document 1" from the second document element of "document 2". Even in a case where the respective versions of the "document 1", the "document 2", and the "document 3" are upgraded through editing, the relationship between the same document elements is held between the new versions of the created documents. Further, even in a case where the document group included in the duplicated document set 310 is collectively duplicated, the relationship the same as the relationship between the document elements in the duplicated document set 310 is duplicated to the document elements of the document group obtained as a result of the duplication.

Figure 12:
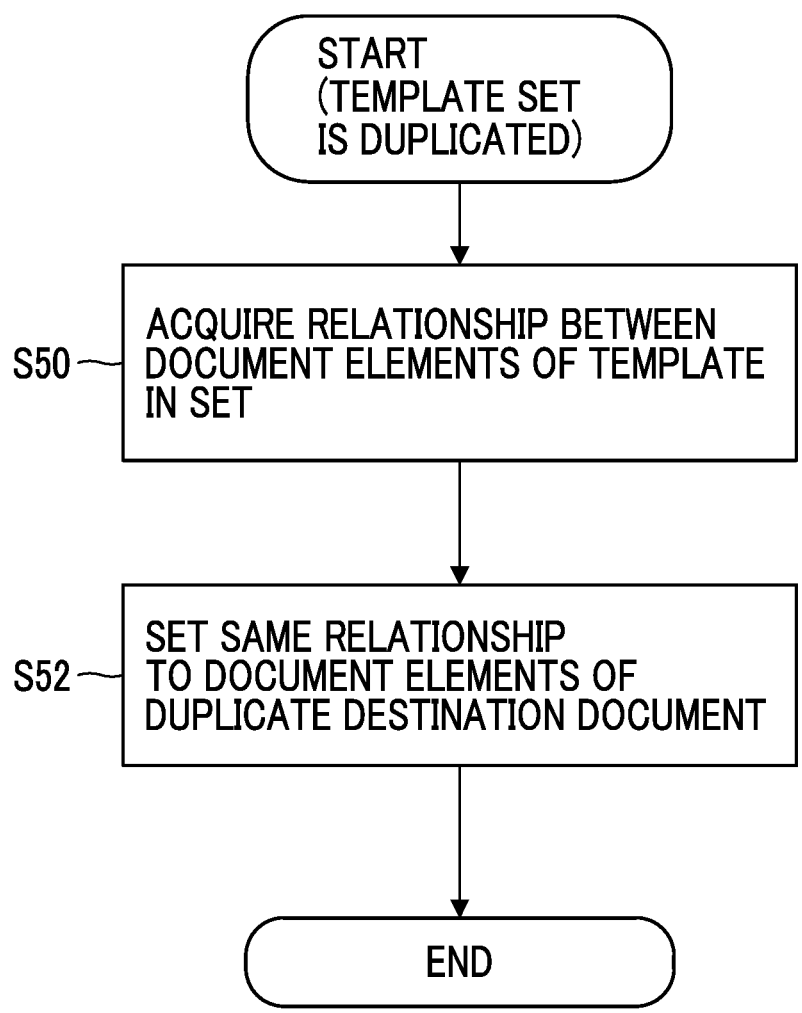
FIG. 12 is a diagram showing a procedure of processing of reflecting the same relationship in document elements of duplication result documents in a case where a set of template documents in which a relationship between document elements is reflected is duplicated.

FIG. 12 shows a processing procedure executed by the processor 102 of the document editing system in the example.

This procedure is executed by a trigger that the processor 102 receives an instruction to duplicate a certain template set. In this procedure, information about the relationship, which is set to the document elements of the template document included in the set, is acquired from the database (S50). Next, the processor 102 sets a relationship, which is the same as the relationship acquired in S50, to the document elements in the document group of the duplication result of each template document in the set (S52). For example, it is considered that a relationship is set between the first document element in the first template document and the second document element in the second template document in the set. In this case, the processor 102 sets the same relationship between a document element corresponding to the first document element among the document elements of the first document which is a duplicate of the first template document, and a document element corresponding to the second document element among the document elements of the second document which is a duplicate of the second template document. The information about the relationship, which is set to the document elements in the duplicated document, is registered in the database.

The procedure of FIG. 12 is an example in which the instruction to duplicate the template set is issued and the template documents in the set are collectively duplicated. However, the procedure is not limited to this, for example, even in a case where all the template documents in the template set are duplicated within a predetermined length of time (for example, 1 hour), as in the case where the template set is collectively duplicated, the procedure of FIG. 12 may be executed. In a case where all the template documents in the template set are duplicated within a predetermined length of time, it is considered that the template set is collectively duplicated.

Reflecting Relationship Which Is Set to Template in Existing Document

The relationship reflected in the document elements of the template document by the procedure of FIG. 7 (and FIG. 10) may be reflected in a document that is present in advance in the document database at the time of the reflection (hereinafter, such a document is referred to as an existing document).

Figure 13:
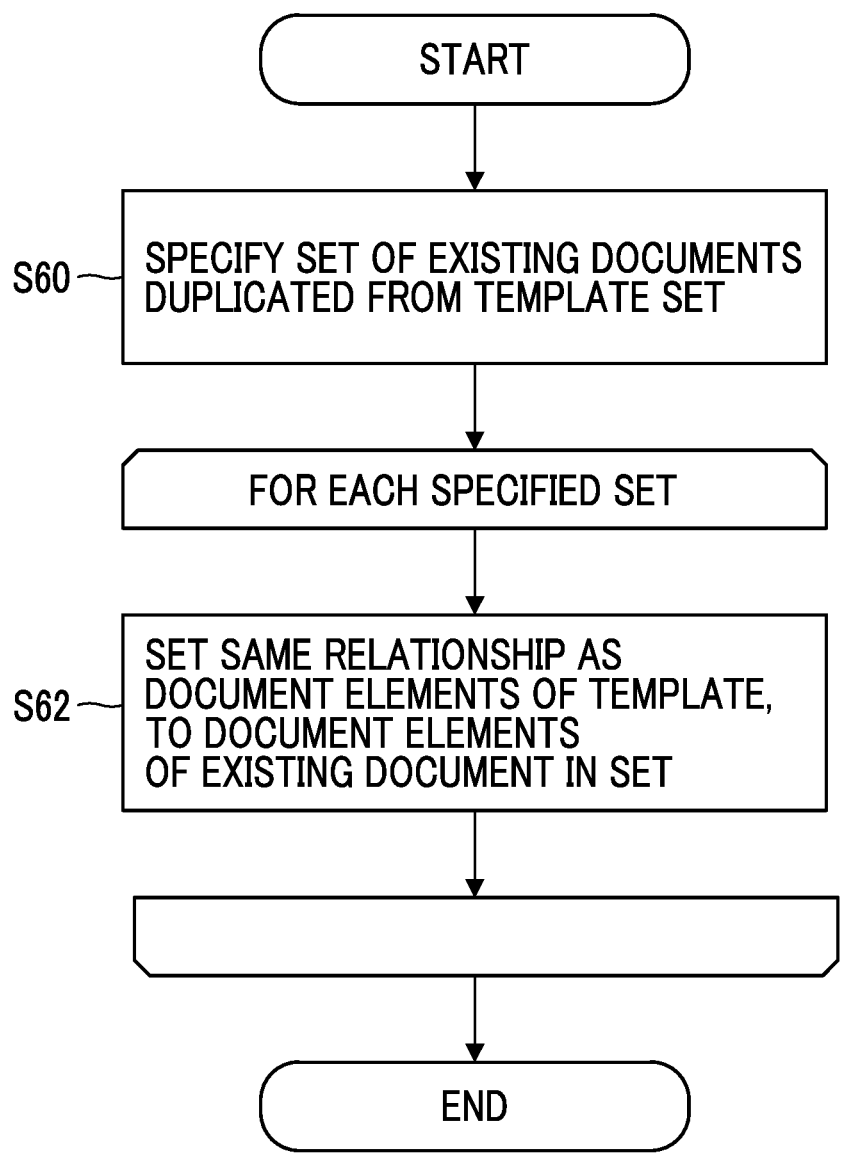
FIG. 13 is a diagram exemplifying a procedure of processing of reflecting the same relationship in an existing duplicate of a set of template documents in which the relationship between document elements is reflected.

FIG. 13 exemplifies the procedure of the processing of reflecting the relationship in the existing document. Also in the procedure of FIG. 13, the concept of a template set is used as in the above-described example described using FIGS. 11 and 12.

The procedure of FIG. 13 is started in a case where a template set in which a relationship is set to the document elements is formed by the processing procedure of FIG. 7 (and FIG. 10) and the like. In this procedure, the processor 102 specifies a set of existing documents duplicated from the template set (S60). In step S60, the processor 102, for example, finds a history record of a duplicate of the template set from the operation history information (refer to FIG. 6), acquires information specifying the document group created by the duplicate from the history record, and sets the document group indicated by the information as the set of existing documents corresponding to the template set. Alternatively, the date and time, at which each template document included in the template set is duplicated, are checked from the operation history information, and all the template documents included in the template set are duplicated within a predetermined length of time. In this case, the document group as a duplication result may be a set of existing documents corresponding to the template set.

Next, the processor 102 executes step S62 for each set of specified existing documents. That is, the processor 102 sets a relationship, which is the same as the relationship between the document elements in the template set, to the document elements of each document in the specified set of existing documents (S62). For example, the following case is considered: a relationship is set between a first document element in a first template document in a template set and a second document element in a second template document, and the first and second existing documents in a set of existing documents, which are duplicates of the template set, are duplicates of the first and second template documents. In this case, the processor 102 sets the same relationship between the document element corresponding to the first document element of the first template document among the document elements of the first existing document and the document element corresponding to the second document element of the second template document among the document elements of the second existing document. The information about the relationship, which is set to the document elements in the document, is registered in the database.

In the exemplary embodiment described above, a document element is an element that constitutes a document. Here, compared to the individual documents managed by the system as constituent elements, there may be a larger unit of document. In this case, the former individual document is a document element for the latter larger unit of document. For example, in a case where a hypertext constituted of a plurality of documents linked through hyperlinks is regarded as a large unit of document, the plurality of documents correspond to the document elements as viewed from the hypertext.

The foregoing description of the exemplary embodiments of the present invention has been provided for the purposes of illustration and description. It is not intended to be exhaustive or to limit the invention to the precise forms disclosed. Obviously, plural modifications and variations will be apparent to practitioners skilled in the art. The exemplary embodiments were chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An information processing apparatus comprising:
a processor configured to
specify a first template document corresponding to a first document including a first document element, and a second template document corresponding to a second document including a second document element by using a relationship is set between the first document element and the second document element which are obtained by respectively accessing attribute data of the first document and the second document;

set the relationship between a first template element which is a document element corresponding to the first document element among document elements in the first template document and a second template element which is a document element corresponding to the second document element among document elements in the second template document;

set the relationship between the document element corresponding to the first template element in a first duplicated document obtained by duplicating the first template document and the document element corresponding to the second template element in a second duplicated document obtained by duplicating the second template document in a case where the first duplicated document and the second duplicated document are created, after setting the relationship between the first template element and the second template element; and store the relationship between the document element of the first duplicated document and the document element of the first template element as an attribute data of the first duplicated document, and store the relationship between the document element of the second duplicated document and the document element of the second template element as an attribute data of the second duplicated document.

2. The information processing apparatus according to claim 1,
wherein the processor is configured to
set the relationship between the document element corresponding to the first template element in an existing third document created from the first template document and the document element corresponding to the second template element in an existing fourth document created from the second template document in a case where the relationship is set between the first template element and the second template element.

3. The information processing apparatus according to claim 2, wherein the first template document is specified on the basis of the number of times of duplication from a root document group of the first document.

4. The information processing apparatus according to claim 3, wherein in a process of reverting back the first document one document at a time to a root side, a document on the root side in a case where the similarity of contents other than a text between adjacent documents is equal to or less than the threshold value is not selected as the first template document.

5. The information processing apparatus according to claim 2, wherein in a process of reverting back the first document one document at a time to a root side, a document on the root side in a case where a similarity of contents other than a text between adjacent documents is equal to or less than a threshold value is not selected as the first template document.

6. The information processing apparatus according to claim 1, wherein the first template document is specified on the basis of the number of times of duplication, from a root document group of the first document.

7. The information processing apparatus according to claim 6, wherein in a process of reverting back the first document one document at a time to a root side, a document on the root side in a case where a similarity of contents other than a text between adjacent documents is equal to or less than a threshold value is not selected as the first template document.

8. The information processing apparatus according to claim 1, wherein in a process of reverting back the first document one document at a time to a root side, a document on the root side in a case where a similarity of contents other than a text between adjacent documents is equal to or less than a threshold value is not selected as the first template document.

9. A non-transitory computer readable medium storing a program causing a computer to execute a process, the process comprising:

specifying a first template document corresponding to a first document including a first document element, and a second template document corresponding to a second document including a second document element by using a relationship is set between the first document element and the second document element which are obtained by respectively accessing attribute data of the first document and the second document;

setting the relationship between a first template element which is a document element corresponding to the first document element among document elements in the first template document and a second template element which is a document element corresponding to the second document element among document elements in the second template document;

setting the relationship between the document element corresponding to the first template element in a first duplicated document obtained by duplicating the first template document and the document element corresponding to the second template element in a second duplicated document obtained by duplicating the second template document in a case where the first duplicated document and the second duplicated document are created, after setting the relationship between the first template element and the second template element; and storing the relationship between the document element of the first duplicated document and the document element of the first template element as an attribute data of the first duplicated document, and storing the relationship between the document element of the second duplicated document and the document element of the second template element as an attribute data of the second duplicated document.

* * * * *